(12) United States Patent
Lim et al.

(10) Patent No.: US 12,352,328 B2
(45) Date of Patent: Jul. 8, 2025

(54) ACTUATOR FOR BRAKE DEVICE

(71) Applicant: HL MANDO CORPORATION, Pyeongtaek-si (KR)

(72) Inventors: Woochul Lim, Yongin-si (KR); Soosung Kim, Seoul (KR); Daejune Jung, Seongnam-si (KR); Joon-kyu Song, Seongnam-si (KR)

(73) Assignee: HL MANDO CORPORATION, Pyeongtaek Si (KR)

( * ) Notice: Subject to any disclaimer, the term of this patent is extended or adjusted under 35 U.S.C. 154(b) by 295 days.

(21) Appl. No.: 17/794,364

(22) PCT Filed: Jan. 25, 2021

(86) PCT No.: PCT/KR2021/000983
§ 371 (c)(1),
(2) Date: Jul. 21, 2022

(87) PCT Pub. No.: WO2021/157928
PCT Pub. Date: Aug. 12, 2021

(65) Prior Publication Data
US 2023/0046722 A1 Feb. 16, 2023

(30) Foreign Application Priority Data
Feb. 5, 2020 (KR) .................. 10-2020-0013484

(51) Int. Cl.
*F16D 65/16* (2006.01)
*F16H 1/16* (2006.01)
(Continued)

(52) U.S. Cl.
CPC .......... *F16D 65/16* (2013.01); *F16D 2121/24* (2013.01); *F16D 2125/50* (2013.01); *F16D 2125/52* (2013.01)

(58) Field of Classification Search
CPC .. F16D 65/16; F16D 2121/24; F16D 2125/40; F16D 2125/52; F16H 1/16; F16H 1/28; F16H 1/32
See application file for complete search history.

(56) References Cited

U.S. PATENT DOCUMENTS 10,823,243 B2 * 11/2020 Song ................. F16D 65/18
11,098,779 B2 * 8/2021 Hur .................. B60T 13/741
(Continued)

FOREIGN PATENT DOCUMENTS

DE 102008051450 4/2010
DE 102019207571 11/2019
(Continued)

OTHER PUBLICATIONS

International Search Report (with partial translation) and Written Opinion issued in corresponding International Patent Application No. PCT/KR2021/000983, dated May 21, 2021.
(Continued)

*Primary Examiner* — Thomas W Irvin
(74) *Attorney, Agent, or Firm* — LEE, HONG, DEGERMAN, KANG & WAIMEY

(57) ABSTRACT

The present disclosure relates to an actuator for a brake device. The actuator includes a housing having a motor accommodating part and a gear accommodating part, a motor accommodated in the motor accommodating part, and a reduction device accommodated in the gear accommodating part, wherein the reduction device includes, a crossed helical gear reduction unit including a driving crossed helical gear coupled to a shaft of the motor, and a ring wheel provided with a driven crossed helical gear engaged with the driving crossed helical gear on an outer circumference thereof, and a planetary gear reduction unit including a sun gear rotating together with the ring wheel, a ring gear provided as an internal gear, a plurality of planetary gears
(Continued)

engaged with the sun gear and the ring gear, and a carrier on which the plurality of planetary gears is rotatably supported and having an output shaft.

6 Claims, 5 Drawing Sheets

(51) Int. Cl.
*F16H 1/28* (2006.01)
*F16D 121/24* (2012.01)
*F16D 125/50* (2012.01)
*F16D 125/52* (2012.01)

(56) References Cited

U.S. PATENT DOCUMENTS

| | | | |
|---|---|---|---|
| 12,036,961 B2* | 7/2024 | Lim | F16D 65/18 |
| 2008/0153648 A1* | 6/2008 | Chen | F16H 47/04 |
| | | | 475/83 |
| 2010/0089199 A1 | 4/2010 | Lafer et al. | |
| 2015/0175143 A1* | 6/2015 | Sun | F16D 65/183 |
| | | | 74/89.16 |
| 2018/0238408 A1* | 8/2018 | Song | F16D 65/18 |
| 2019/0360542 A1* | 11/2019 | Song | F16D 65/18 |
| 2022/0017057 A1* | 1/2022 | Lee | H02K 7/1166 |
| 2022/0169226 A1* | 6/2022 | Lim | B60T 13/741 |
| 2022/0185256 A1* | 6/2022 | Lim | F16D 65/18 |
| 2022/0281429 A1* | 9/2022 | Song | B60T 13/746 |
| 2023/0068562 A1* | 3/2023 | Lim | F16D 65/18 |
| 2023/0082813 A1* | 3/2023 | Lim | F16D 65/18 |
| | | | 188/72.1 |
| 2023/0375058 A1* | 11/2023 | Jung | F16D 65/14 |

FOREIGN PATENT DOCUMENTS

| | | |
|---|---|---|
| EP | 1080318 B1 | 1/2002 |
| JP | 2015-124878 A | 7/2015 |
| JP | 6254697 | 12/2017 |
| KR | 10-2010-0138101 A | 12/2010 |
| KR | 10-2019-0133834 | 12/2019 |
| KR | 10-2019-0133834 A | 12/2019 |

OTHER PUBLICATIONS

Korean Intellectual Property Office Application No. 10-2020-0013484, Office Action dated Aug. 28, 2024, 8 pages.
Deutsches Patent—und Markenamt Application No. 112021000869.2, Office Action dated Apr. 11, 2025, 7 pages.

* cited by examiner

[Figure 1]
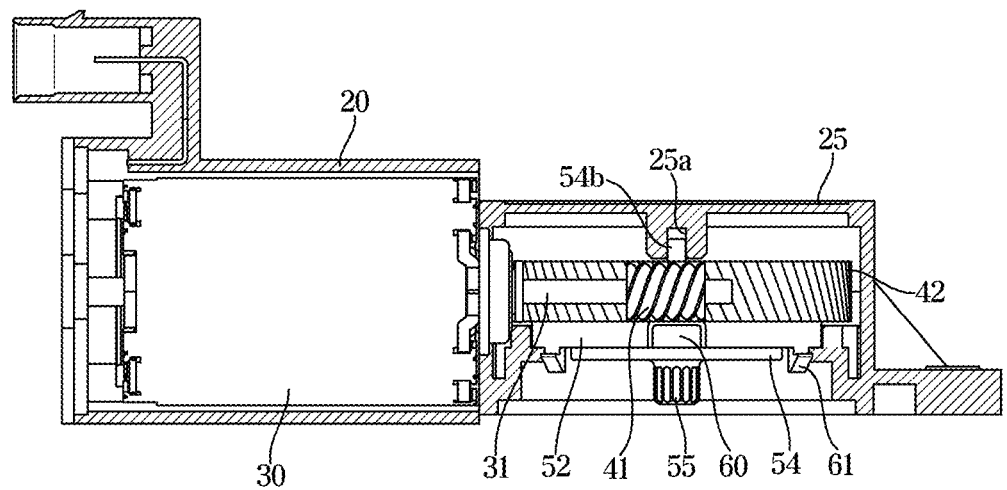

[Figure 2]
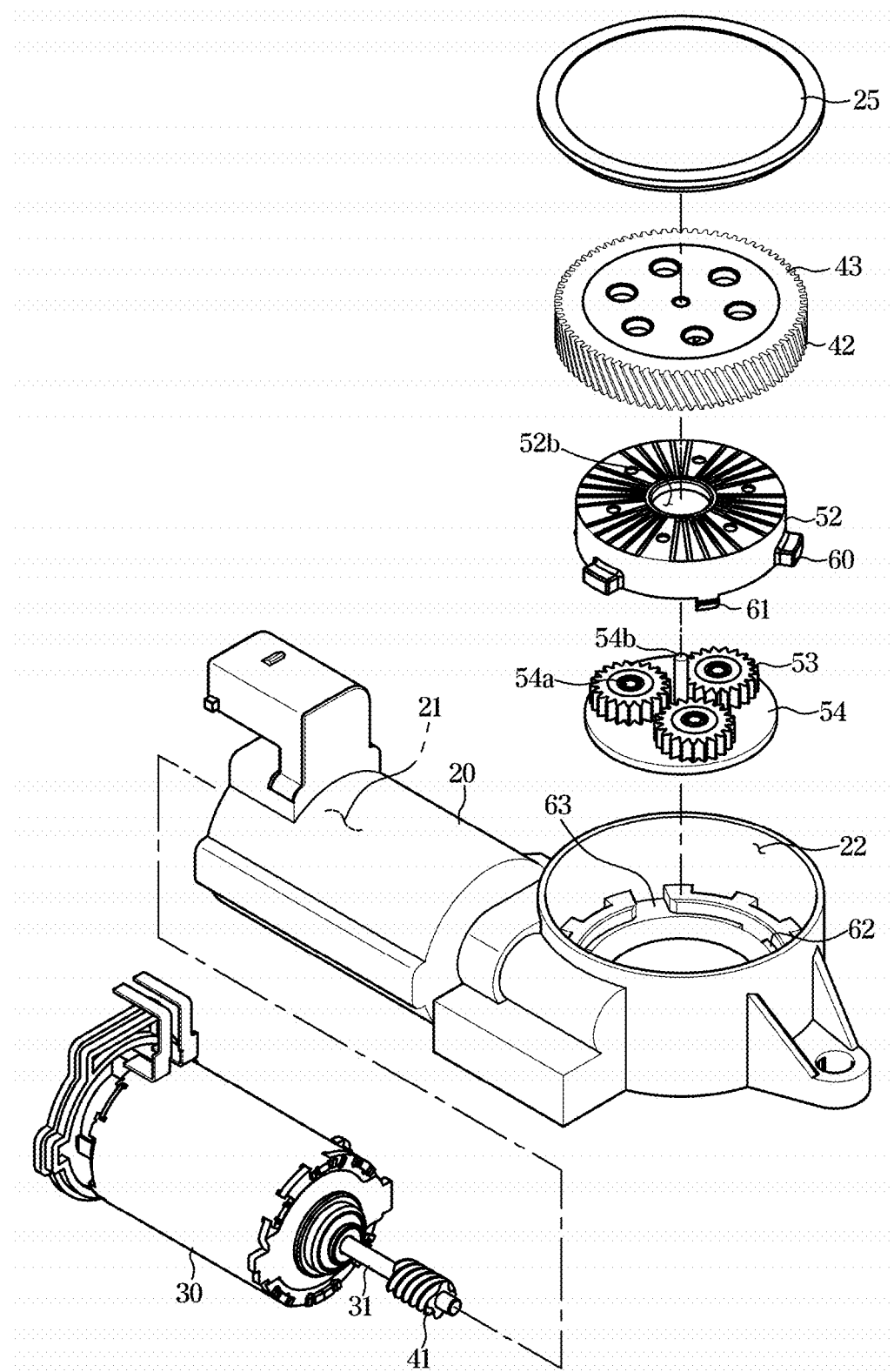

[Figure 3]
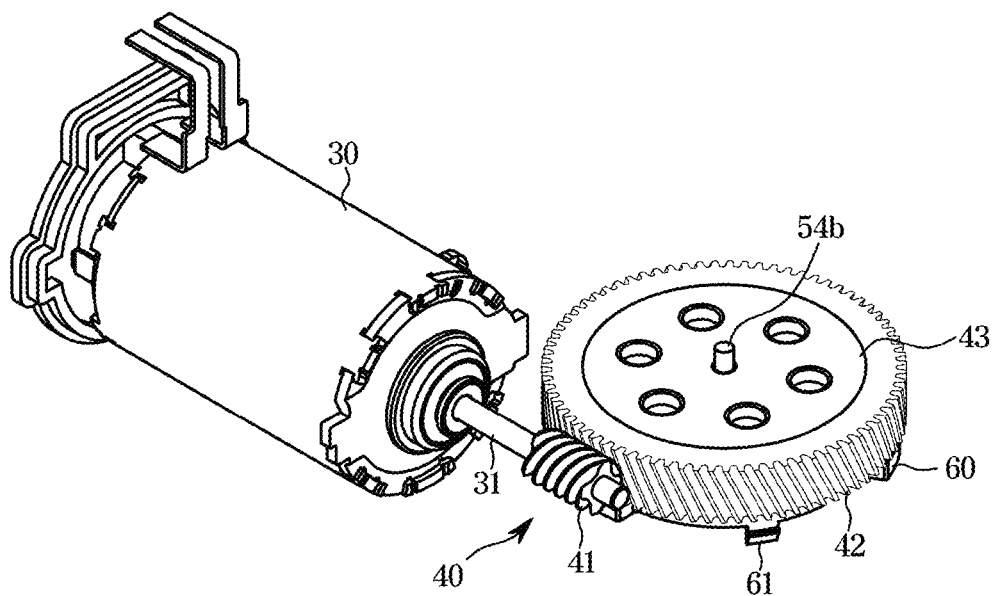
[Figure 4]
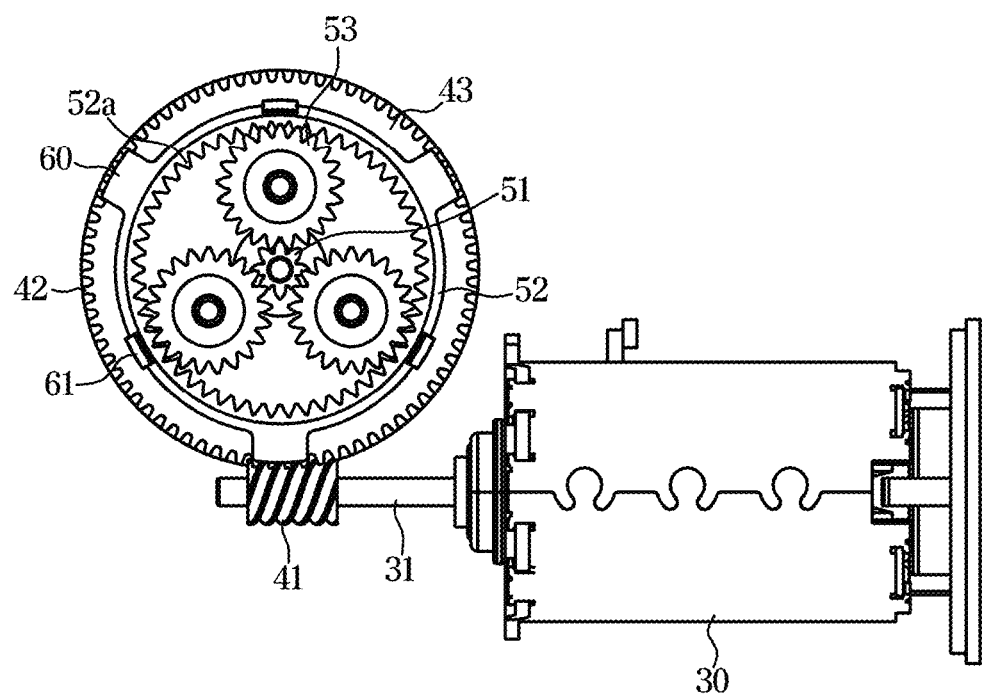

【Figure 5】
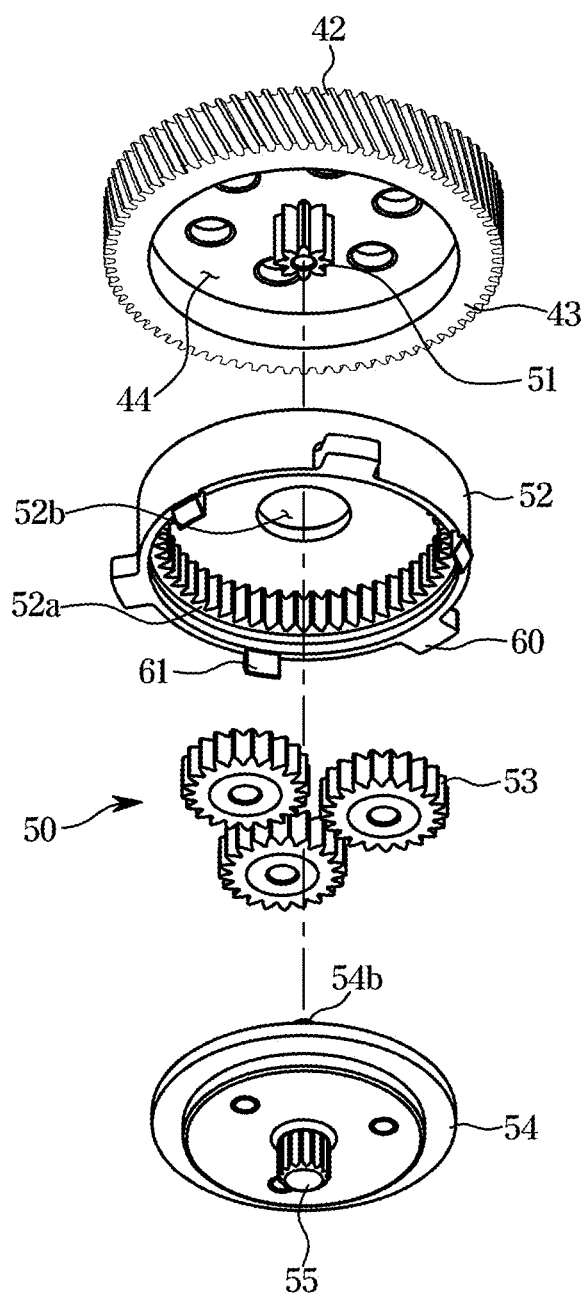

[Figure 6]
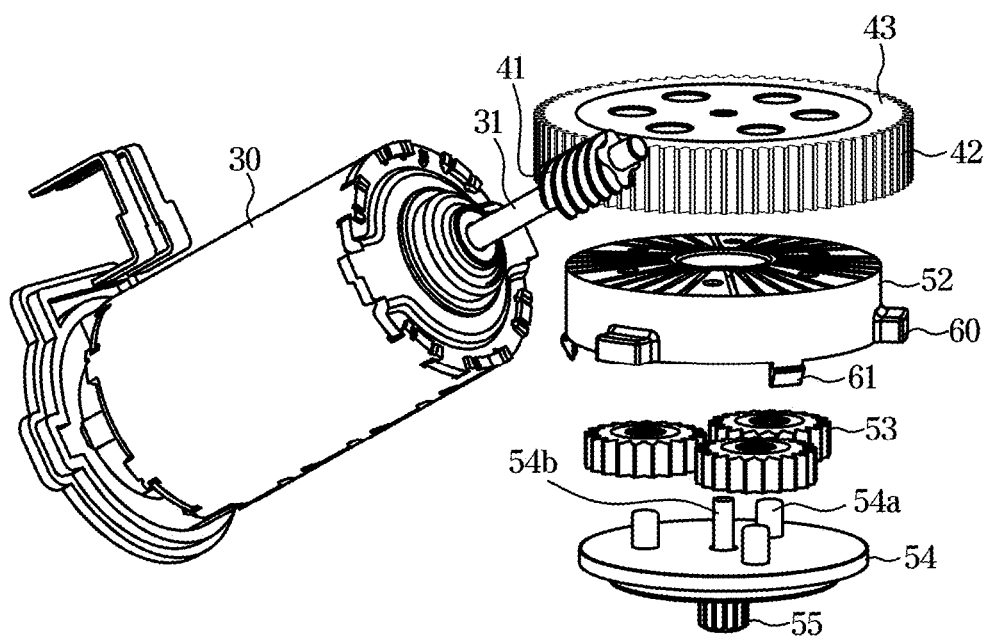

ACTUATOR FOR BRAKE DEVICE

CROSS-REFERENCE OF RELATED APPLICATIONS

This application is the U.S. National Phase under 35 U.S.C. § 371 of International Patent Application No. PCT/KR2021/000983, filed on Jan. 25, 2021, which in turn claims the benefit of Korean Application No. 10-2020-0013484, filed on Feb. 5, 2020, the entire disclosures of which applications are incorporated by reference herein.

TECHNICAL FIELD

The present disclosure relates to an actuator for a brake device, and more particularly, to an actuator for a brake device capable of performing a parking function by operation of a motor.

BACKGROUND ART

In general, a brake device is a device for stopping a vehicle from moving during braking or parking, and serves to hold wheels of the vehicle from rotating.

Recently, an electronic parking brake (EPB) system for electronically controlling an operation of a parking brake has been widely used, which is mounted on a conventional disc brake to perform a function of the parking brake. Electronic disc brakes include a cable puller type, a motor-on-caliper (MOC) type, and a hydraulic parking brake type.

Korean Patent Publication No. 10-2011-0072877 (Jun. 29, 2011) discloses a structure of a MOC-type electronic parking brake actuator in which a motor for generating power is connected to an actuator used in the electronic disc brake so that a braking operation is performed by decelerating the power generated from the motor and increasing a torque and transmitting the torque to the actuator and a caliper by using a plurality of gear devices.

DISCLOSURE

Technical Problem

The present disclosure is directed to providing an actuator for a brake device capable of improving productivity by reducing the number of parts in the actuator and increasing a degree of freedom in design.

Technical Solution

An aspect of the present disclosure provides an actuator for a brake device including a housing having a motor accommodating part and a gear accommodating part, a motor accommodated in the motor accommodating part, and a reduction device accommodated in the gear accommodating part, wherein the reduction device includes, a crossed helical gear reduction unit including a driving crossed helical gear coupled to a shaft of the motor, and a ring wheel provided with a driven crossed helical gear engaged with the driving crossed helical gear on an outer circumference thereof, and a planetary gear reduction unit including a sun gear rotating together with the ring wheel, a ring gear provided as an internal gear, a plurality of planetary gears engaged with the sun gear and the ring gear, and a carrier on which the plurality of planetary gears is rotatably supported and having an output shaft.

The driven crossed helical gear may be formed in a spur gear shape.

The ring wheel may be formed in a hollow cylindrical shape with an open lower side to accommodate the ring gear therein, and the sun gear may be inserted into the ring gear by passing through a shaft hole of the ring gear.

The ring gear may be coupled to the gear accommodating part by a hook fastening method.

A plurality of locking ribs may be provided on an outer circumference of the ring gear to restrict rotation of the ring gear in the gear accommodating part.

The reduction device is configured for one-stage reduction by the crossed helical gear reduction unit and two-stage reduction by the planetary gear reduction unit.

The shaft of the motor and the shaft of the ring wheel are orthogonal to each other.

A rotational force of the driving crossed helical gear is directly transmitted to the ring wheel through the driven crossed helical gear.

The shaft of the ring wheel is arranged vertically, and the shaft of the motor is arranged to be inclined.

Advantageous Effects

According to the present disclosure, because a motor is output through a two-stage reduction structure through a crossed helical gear reduction unit and a planetary gear reduction unit, the number of parts is reduced, so that productivity can be improved through weight reduction and cost reduction.

In addition, according to the present disclosure, because power of the motor can be transmitted in a state of enable engaging at an arbitrary angle by using the crossed helical gear reduction unit, the degree of freedom in design is increased compared to a power transmission structure of a conventional worm gear, which is always orthogonally engaged due to its characteristics, so that an actuator can be manufactured such that a caliper and the motor do not interfere with each other.

DESCRIPTION OF DRAWINGS

FIG. 1 is a partial cross-sectional view of an actuator for a brake device according to an embodiment of the present disclosure.

FIG. 2 is an exploded perspective view of the actuator for a brake device according to an embodiment of the present disclosure.

FIG. 3 is a view illustrating a crossed helical gear reduction unit of the actuator for a brake device according to an embodiment of the present disclosure.

FIG. 4 is a view illustrating a planetary gear reduction unit of the actuator for a brake device according to an embodiment of the present disclosure.

FIG. 5 is an exploded perspective view of the planetary gear reduction unit according to an embodiment of the present disclosure.

FIG. 6 is a view illustrating a crossed helical gear reduction unit of an actuator for a brake device according to another embodiment of the present disclosure.

MODE OF THE DISCLOSURE

Hereinafter, embodiments of the present disclosure will be described in detail with reference to the accompanying drawings. The embodiments described below are provided by way of example so that those skilled in the art will be able to fully understand the spirit of the present disclosure. The present disclosure is not limited to the embodiments described below, but may be embodied in other forms. In order to clearly explain the present disclosure, parts not related to the description are omitted from the drawings, and widths, lengths, and thicknesses of components may be exaggerated for convenience. Throughout this specification, like reference numerals refer to like elements.

FIG. 1 is a partial cross-sectional view of an actuator for a brake device according to an embodiment of the present disclosure, FIG. 2 is an exploded perspective view of the actuator for a brake device according to an embodiment of the present disclosure, FIG. 3 is a view illustrating a crossed helical gear reduction unit of the actuator for a brake device according to an embodiment of the present disclosure, FIG. 4 is a view illustrating a planetary gear reduction unit of the actuator for a brake device according to an embodiment of the present disclosure, and FIG. 5 is an exploded perspective view of the planetary gear reduction unit according to an embodiment of the present disclosure.

Referring to FIGS. 1 to 5, an actuator 10 for a brake device according to an embodiment of the present disclosure includes a housing 20 having a motor accommodating part 21 and a gear accommodating part 22.

The motor accommodating part 21 having one side open to accommodate a motor 30 may be formed on one side of the housing 20, and the gear accommodating part 22 having a vertically open cylindrical shape to accommodate a reduction device may be formed on the other side of the housing 20.

The reduction device may be mounted in the gear accommodating part 22 through the open portion of the gear accommodating part 22, and the open portion of the gear accommodating part 22 may be sealed by a cover 25.

Power of the motor 30 is increased through the reduction device and output through an output shaft 55.

The reduction device has a two-stage reduction structure including a crossed helical gear reduction unit 40 and a planetary gear reduction unit 50.

The crossed helical gear reduction unit 40 includes a driving crossed helical gear 41 coupled to a shaft 31 of the motor 30, and a ring wheel 43 provided with a driven crossed helical gear 42 engaged with the driving crossed helical gear 41 on an outer circumference thereof.

The driving crossed helical gear 41 and the driven crossed helical gear 42 may be formed in a helical gear shape, or as illustrated in FIG. 6, the driving crossed helical gear 41 may be formed in a helical gear shape, and the driven crossed helical gear 42 may be formed in a spur gear shape.

The crossed helical gear reduction unit 40 allows for engaging at an arbitrary angle when power is transmitted from the motor 30 to the ring wheel 43 (that is, movement between misaligned shafts is possible), so a degree of freedom in design may be increased, and due to this, the caliper and the motor 30 mounted in a narrow space of the vehicle may be manufactured so as not to interfere with each other.

That is, as illustrated in FIG. 3, the shaft 31 of the motor 30 and the shaft of the ring wheel 43 may be arranged to be perpendicular to each other, or as illustrated in FIG. 6, the shaft 31 of the motor 30 and the shaft of the ring wheel 43 may be arranged to intersect at an arbitrary angle, in other word, the shaft of the ring wheel 43 is arranged vertically, and the shaft 31 of the motor 30 is arranged to be inclined.

The planetary gear reduction unit 50 includes a sun gear 51 rotating together with the ring wheel 43, a ring gear 52 provided as an internal gear, a plurality of planetary gears 53 engaged with the sun gear 51 and the ring gear 52, and a carrier 54 on which the plurality of planetary gears 53 is rotatably supported and having an output shaft 55.

The ring wheel 43 is formed in a hollow cylindrical shape with one side open, the driven crossed helical gear 42 engaged with the driving crossed helical gear 41 provided on the shaft 31 of the motor 30 is provided on the outer circumference of the ring wheel 43, and the sun gear 51 is fixedly installed in a central portion of an accommodating space 44 inside the ring wheel 43.

The ring gear 52 is formed in a hollow cylindrical shape with one side open, and is rotatably supported in the accommodating space 44 inside the ring wheel 43.

An internal gear 52a engaged with the plurality of planetary gears 53 is formed on an inner circumference of the ring gear 52, and a plurality of locking ribs 60 is provided on an outer circumference of the ring gear 52 to restrict rotation when the ring gear 52 is mounted on the gear accommodating part 22.

A hook 61 is provided at a lower end of the ring gear 52 to be coupled when the ring gear 52 is mounted to the gear accommodating part 22, so that the ring gear 52 may be detachably coupled to the gear accommodating part 22 by a hook fastening method.

A shaft hole 52b through and into which the sun gear 51 may pass and be inserted when the ring wheel 43 is mounted is formed in the center of the other sealed side of the ring gear 52.

When the ring gear 52 is mounted to the gear accommodating part 22, the hook 61 may be inserted into and coupled to a hook groove 62 provided in the gear accommodating part 22, and the locking rib 60 may be seated and supported in a rib groove 63 provided in the gear accommodating part 22.

The carrier 54 is formed in a disk shape, a plurality of planetary gear shafts 54a spaced apart from each other by a predetermined interval along a circumferential direction is provided on an upper surface of the carrier 54, and a carrier shaft 54b is provided at the center of the upper surface of the carrier 54.

The plurality of planetary gears 53 may be rotatably supported on the plurality of planetary gear shafts 54a, and the carrier shaft 54b may be rotatably coupled to a shaft support hole 25a formed on the cover 25 by penetrating the center of the sun gear 51.

An output shaft 55 is provided at the center of a lower surface of the carrier 54. The output shaft 55 may rotate integrally with the carrier 54.

Hereinafter, an operation of the actuator for a brake device according to an embodiment of the present disclosure will be described.

When a driver operates a parking brake after stopping the vehicle, the motor 30 is driven to rotate the shaft 31 of the motor 30, and the driving crossed helical gear 41 provided on the shaft 31 of the motor 30 rotates together. Accordingly, as the ring wheel 43 rotates by the rotation of the driven crossed helical gear 42 engaged with the driving crossed helical gear 41, one-stage reduction is performed.

A rotational force of the ring wheel 43 is transmitted to the plurality of planetary gears 53 through the sun gear 51, and the plurality of planetary gears 53 revolves around the sun gear 51 along the internal gear 52a of the ring gear 52. As the carrier 54 is rotated by the plurality of planetary gears 53 revolving in this way, the output shaft 55 is rotated in a state in which two-stage reduction is performed.

As a rotational force of the driving crossed helical gear 41 coupled the shaft 31 of the motor 30 is directly transmitted to the ring wheel 43 through the driven crossed helical gear 42, compared to a conventional three-stage reduction structure, not only reduction efficiency is improved, but also an operating time of the actuator 10 may be significantly reduced due to a decrease in the total reduction ratio.

In addition, as the crossed helical gear reduction unit 40 capable of being engaged at any angle as a single-stage reduction structure is provided, due to the increase in the degree of freedom in design, there is an advantage in that the mounting convenience in the vehicle is significantly improved when it is installed in a narrow space of the vehicle.

The foregoing has illustrated and described specific embodiments. However, it should be understood by those of skilled in the art that the disclosure is not limited to the above-described embodiments, and various changes and modifications may be made without departing from the technical idea of the disclosure described in the following claims.

The invention claimed is:

1. An actuator for a brake device comprising:
    a housing having a motor accommodating part and a gear accommodating part;
    a motor accommodated in the motor accommodating part; and
    a reduction device accommodated in the gear accommodating part,
    wherein the reduction device comprises:
    a crossed helical gear reduction unit comprising a driving crossed helical gear coupled to a shaft of the motor, and a ring wheel provided with a driven crossed helical gear engaged with the driving crossed helical gear on an outer circumference thereof; and
    a planetary gear reduction unit comprising a sun gear rotating together with the ring wheel, a ring gear provided as an internal gear, a plurality of planetary gears engaged with the sun gear and the ring gear, and a carrier on which the plurality of planetary gears is rotatably supported and having an output shaft,
    wherein the driving crossed helical gear is formed in a helical gear shape,
    wherein the driven crossed helical gear is formed in a spur gear shape,
    wherein the shaft of the motor is arranged to be inclined with respect to an axial direction of a shaft of the ring wheel, and
    wherein the axial direction of the shaft of the motor and the axial direction of the shaft of the ring wheel are not perpendicular to each other.

2. The actuator according to claim 1, wherein the ring wheel is formed in a hollow cylindrical shape with an open lower side to accommodate the ring gear therein, and the sun gear is inserted into the ring gear by passing through a shaft hole of the ring gear.

3. The actuator according to claim 2, wherein the ring gear is coupled to the gear accommodating part by a hook fastening method.

4. The actuator according to claim 3, wherein a plurality of locking ribs is provided on an outer circumference of the ring gear to restrict rotation of the ring gear in the gear accommodating part.

5. The actuator according to claim 1, wherein the reduction device is configured for one-stage reduction by the crossed helical gear reduction unit and two-stage reduction by the planetary gear reduction unit.

6. The actuator according to claim 1, wherein a rotational force of the driving crossed helical gear is directly transmitted to the ring wheel through the driven crossed helical gear.

* * * * *